US008434645B2

(12) United States Patent
Crawford et al.

(10) Patent No.: US 8,434,645 B2
(45) Date of Patent: May 7, 2013

(54) DISPENSING CONTAINER WITH PUMP FITMENT

(75) Inventors: John C. Crawford, Mahopac, NY (US); George Trepina, Southbury, CT (US)

(73) Assignee: Colgate-Palmolive Company, New York, NY (US)

( * ) Notice: Subject to any disclaimer, the term of this patent is extended or adjusted under 35 U.S.C. 154(b) by 343 days.

(21) Appl. No.: 12/810,538

(22) PCT Filed: Jan. 15, 2010

(86) PCT No.: PCT/US2010/021205
§ 371 (c)(1), (2), (4) Date: Jun. 25, 2010

(87) PCT Pub. No.: WO2010/083419
PCT Pub. Date: Jul. 22, 2010

(65) Prior Publication Data

US 2011/0049191 A1 Mar. 3, 2011

Related U.S. Application Data

(60) Provisional application No. 61/145,373, filed on Jan. 16, 2009.

(51) Int. Cl.

| | |
|---|---|
| ***B67D 1/16*** | (2006.01) |
| ***B67D 7/58*** | (2010.01) |
| ***B67D 7/78*** | (2010.01) |
| ***B65D 88/54*** | (2006.01) |
| ***G01F 11/00*** | (2006.01) |

(52) U.S. Cl.
USPC ...... 222/109; 222/321.9; 222/382; 222/464.1

(58) Field of Classification Search .................. 222/382, 222/464.1, 321.1–321.9, 372, 383.1, 108, 222/109, 111, 147
See application file for complete search history.

(56) References Cited

U.S. PATENT DOCUMENTS

| | | | |
|---|---|---|---|
| 372,892 | A | 11/1887 | Bunting |
| 1,986,741 | A | 1/1935 | Moser |

(Continued)

FOREIGN PATENT DOCUMENTS

| | | |
|---|---|---|
| DE | 1 625 201 | 2/1970 |
| DE | 2 323 561 | 11/1974 |

(Continued)

OTHER PUBLICATIONS

International Search Report and Written Opinion from the International Searching Authority for corresponding International Application No. PCT/US2010/021205 mailed Apr. 6, 2010.

*Primary Examiner* — Paul R Durand
*Assistant Examiner* — Matthew Lembo
(74) *Attorney, Agent, or Firm* — Judy W. Chung

(57) ABSTRACT

A dispensing container with a fitment, the fitment allows a dispensing pump on the dispensing container to be reused with another container. The container has a fitment secured into the container using a tamper-proof structure with the reusable dispensing pump of a structure to fit into this fitment. The fitment and the container neck are injection molded to maintain the close tolerances for the tamper-proof structure. The fitment has at least one drain aperture and at least one pressure equalization aperture. When the reusable dispensing pump is inserted into the fitment, liquid in the fitment can escape through the drain aperture into the container and pressure in the container is equalized through the pressure equalization aperture. The closure and upper part of the container are both of a conical structure to enhance alignment.

12 Claims, 12 Drawing Sheets

U.S. PATENT DOCUMENTS

| | | | | | |
|---|---|---|---|---|---|
| 2,351,227 | A | * | 6/1944 | Petrone | 215/25 |
| 2,783,091 | A | | 2/1957 | Haldy | |
| 2,915,225 | A | | 12/1959 | Atkins | |
| 3,079,022 | A | | 2/1963 | Tompkins | |
| 3,120,906 | A | | 2/1964 | Harnage | |
| 3,159,298 | A | | 12/1964 | Saw | |
| 3,187,960 | A | | 6/1965 | Gorman | |
| 3,402,843 | A | | 9/1968 | Campbell | |
| 3,412,900 | A | | 11/1968 | Macaulay | |
| 3,622,053 | A | | 11/1971 | Ryden | |
| 3,934,761 | A | | 1/1976 | Gentreau | |
| 3,949,910 | A | | 4/1976 | Focht | |
| 3,991,914 | A | | 11/1976 | Kotuby et al. | |
| 4,076,147 | A | | 2/1978 | Schmit | |
| 4,154,369 | A | | 5/1979 | Morane | |
| 4,241,854 | A | | 12/1980 | Bennett et al. | |
| 4,273,247 | A | | 6/1981 | Earls | |
| 4,286,636 | A | | 9/1981 | Credle | |
| 4,327,782 | A | | 5/1982 | McKibben et al. | |
| 4,437,588 | A | * | 3/1984 | Shay | 222/321.2 |
| 4,445,539 | A | * | 5/1984 | Credle | 137/614.03 |
| 4,485,943 | A | | 12/1984 | Czech | |
| 4,565,302 | A | | 1/1986 | Pfeiffer et al. | |
| 4,625,897 | A | | 12/1986 | Wortley | |
| 4,770,323 | A | | 9/1988 | Debard | |
| 4,798,303 | A | | 1/1989 | Arnold | |
| 4,832,237 | A | | 5/1989 | Hurford, Jr. | |
| 4,852,774 | A | | 8/1989 | Crawford | |
| 4,936,487 | A | | 6/1990 | Mader et al. | |
| 5,064,102 | A | | 11/1991 | Montaner | |
| 5,261,565 | A | * | 11/1993 | Drobish et al. | 222/95 |
| 5,328,069 | A | | 7/1994 | Cohanfard | |
| 5,343,901 | A | * | 9/1994 | Meshberg | 141/2 |
| 5,358,147 | A | | 10/1994 | Adams et al. | |
| 5,516,006 | A | | 5/1996 | Meshberg | |
| 5,549,223 | A | * | 8/1996 | Hori | 222/153.13 |
| 5,595,326 | A | | 1/1997 | Bougamont et al. | |
| 5,657,910 | A | | 8/1997 | Keyser | |
| 5,692,649 | A | | 12/1997 | Schwab | |
| 5,785,195 | A | | 7/1998 | Zwemer | |
| 5,813,571 | A | | 9/1998 | Gaucher | |
| 5,875,934 | A | | 3/1999 | Miller et al. | |
| 5,882,574 | A | * | 3/1999 | Geisinger | 264/539 |
| 5,926,953 | A | | 7/1999 | Behar | |
| 5,992,703 | A | | 11/1999 | Fuchs | |
| 6,000,633 | A | * | 12/1999 | Lund et al. | 239/211 |
| 6,053,363 | A | | 4/2000 | Revenu | |
| 6,082,588 | A | | 7/2000 | Markey et al. | |
| 6,142,345 | A | | 11/2000 | Laible | |
| 6,269,976 | B1 | | 8/2001 | DeJonge | |
| 6,412,659 | B1 | | 7/2002 | Kneer | |
| 6,415,962 | B1 | | 7/2002 | Bougamont et al. | |
| 6,435,376 | B1 | | 8/2002 | Meshberg | |
| 6,540,116 | B1 | | 4/2003 | Petitjean et al. | |
| 6,547,106 | B2 | | 4/2003 | Bonninque | |
| 6,669,062 | B1 | * | 12/2003 | Laible | 222/464.1 |
| 6,729,500 | B1 | | 5/2004 | Dobbs et al. | |
| 6,860,404 | B2 | | 3/2005 | Duqueroie | |
| 7,021,495 | B2 | | 4/2006 | De Laforcade | |
| 2004/0159625 | A1 | | 8/2004 | Kwon | |
| 2006/0237489 | A1 | | 10/2006 | Lataulade | |
| 2008/0105713 | A1 | * | 5/2008 | Fahy et al. | 222/382 |
| 2009/0236372 | A1 | * | 9/2009 | Maddy | 222/382 |

FOREIGN PATENT DOCUMENTS

| | | |
|---|---|---|
| EA | 008813 | 8/2007 |
| EP | 1 579 924 | 9/2005 |
| EP | 1 671 705 | 6/2006 |
| FR | 2 504 891 | 5/1982 |
| FR | 2 377 946 | 8/1987 |
| RU | 2185893 | 7/2002 |
| RU | 2229348 | 5/2004 |
| RU | 2279927 | 7/2006 |
| SU | 1816514 | 5/1993 |

* cited by examiner

DISPENSING CONTAINER WITH PUMP FITMENT

CROSS-REFERENCE TO RELATED PATENT APPLICATIONS

The present application is a national stage entry under 35 U.S.C. §371 of International Patent Application No. PCT/US2010/021205, filed Jan. 15, 2010, which in turn claims the benefit of U.S. Provisional Patent Application No. 61/145,373, filed Jan. 16, 2009, the entireties of which are hereby incorporated by reference.

BACKGROUND

This invention relates to a substantially blow-molded dispensing container with a fitment where the dispensing pump can be reused with additional refill dispensing containers, but the dispensing container and the fitment are of a structure to preclude the reuse of the dispensing container. This structure prevents the use of the dispensing container with counterfeit products.

Containers with dispensing pumps are used for a number of different products. In many uses the products are related to the health and safety of the user. For this reason the containers should not be reused for a counterfeit product or for a different product. In use for a counterfeit product the consumer will purchase the counterfeit product in the belief that it is the original product. In this regard the consumer would not be receiving the benefits of the original product. The consumer could also be receiving a product that could be harmful to his/her health. For the manufacturer of the original product this will lead to a loss of sales and if the counterfeit product is defective it can cause injury. Tamper-proof structures are developed to prevent the reuse of dispensing containers for counterfeit products. The present invention is directed to a solution to prevent the reuse of dispensing containers for counterfeit products. There is provided security, lower cost and a structure that precludes the overflow of liquid from the container when a dispensing pump is inserted into the dispensing container.

SUMMARY

In one embodiment, a dispensing container comprises a body; a neck having an opening; a fitment positioned in said opening and attached to said neck; and a pump mechanism comprising an input tube at a lower end of said pump dispenser; a pump actuator; and a pump exit at an upper end of said pump dispenser, wherein said fitment is adapted to receive said pump dispenser and said fitment comprises at least one pressure equalization aperture in communication with an interior of said dispensing container; at least one drain aperture; and a dip tube that that extends into said body, said dip tube adapted to surround said input tube, wherein when said pump dispenser is inserted into said fitment, a liquid in said fitment can flow into said dispensing container through said at least one drain aperture.

In another embodiment, a dispensing container comprises a body; a neck having an opening; at least one of a recess or a projection on an exterior surface of said neck; a fitment positioned in said opening, the fitment comprising a flange that extends outwardly from said upper section, said flange comprising a downwardly extending peripheral wall having at least one of a projection or an aperture to mate with said at least one of a recess or a projection on said neck; and a pump mechanism in said fitment comprising: an input tube at a lower end; a pump actuator; and a pump exit at an upper end.

In either embodiment a mid-section of the fitment can have a plurality of apertures communicating with the interior of the container and an upper section of the fitment has a plurality of pressure equalization apertures. Further, in either embodiment the container neck and the fitment each are injection molded while the remainder of the container is blow molded.

In a further embodiment, a fitment for a dispensing container comprises a mid-section; a upper section above said mid-section; a lower section below said mid-section; at least one pressure equalization aperture in said upper section; and at least one drain aperture in said mid section

DETAILED DESCRIPTION

A dispensing container along with its pertinent parts will be disclosed in its preferred embodiments with reference to the drawings. However, the dispensing container can be modified in various ways and yet be within the concept of the present invention.

Figure 1:
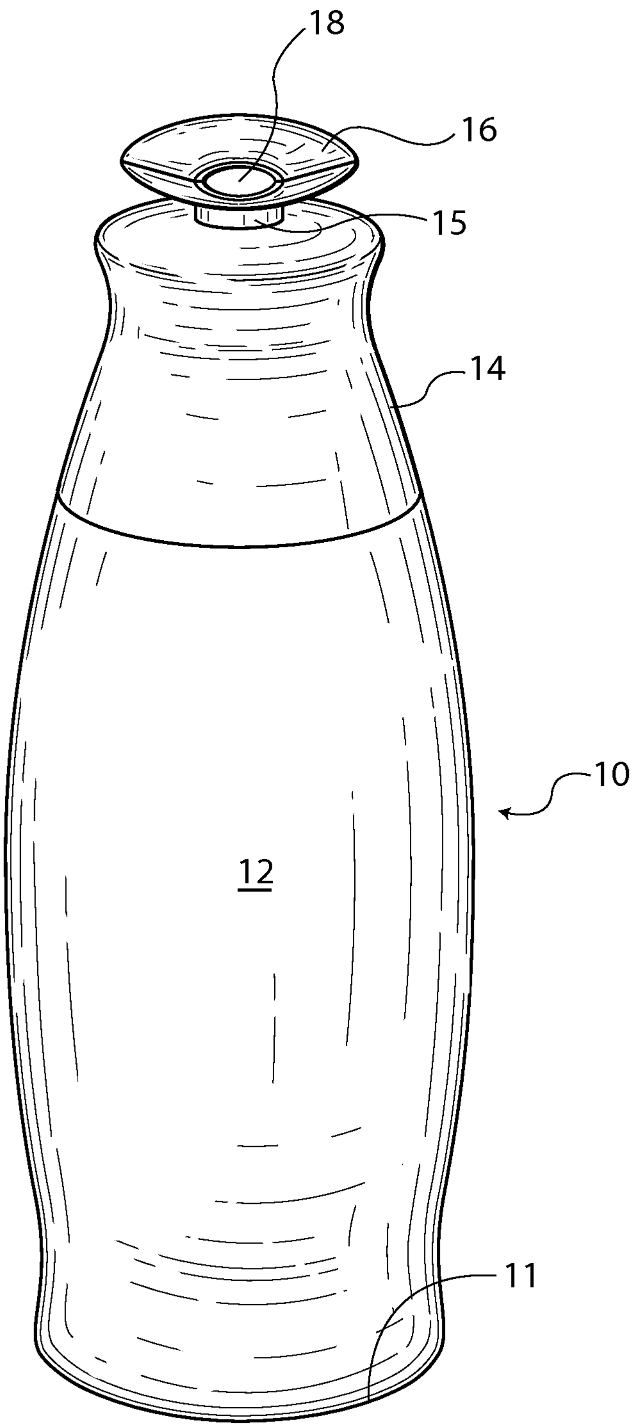
FIG. 1 is a perspective view of the dispensing container, according to one embodiment of the present invention.

In FIG. 1, there is illustrated a perspective view of the dispensing container 10, according to one embodiment of the present invention. The container 10 comprises a body 12, a base 11, a closure 14 and a pump head actuator 16. The pump head actuator 16 comprises a dispensing aperture 18. A stem 15 connects the pump head actuator 16 to a pump mechanism (not visible). The dispensing container 10 is used to dispense a fluid from the container body 12 through the dispensing aperture 18. As will be discussed in further detail below, the dispensing container 10 is designed so that the closure 14 and pump head actuator 16 may be reused with a replacement container body 12.

Figure 2:
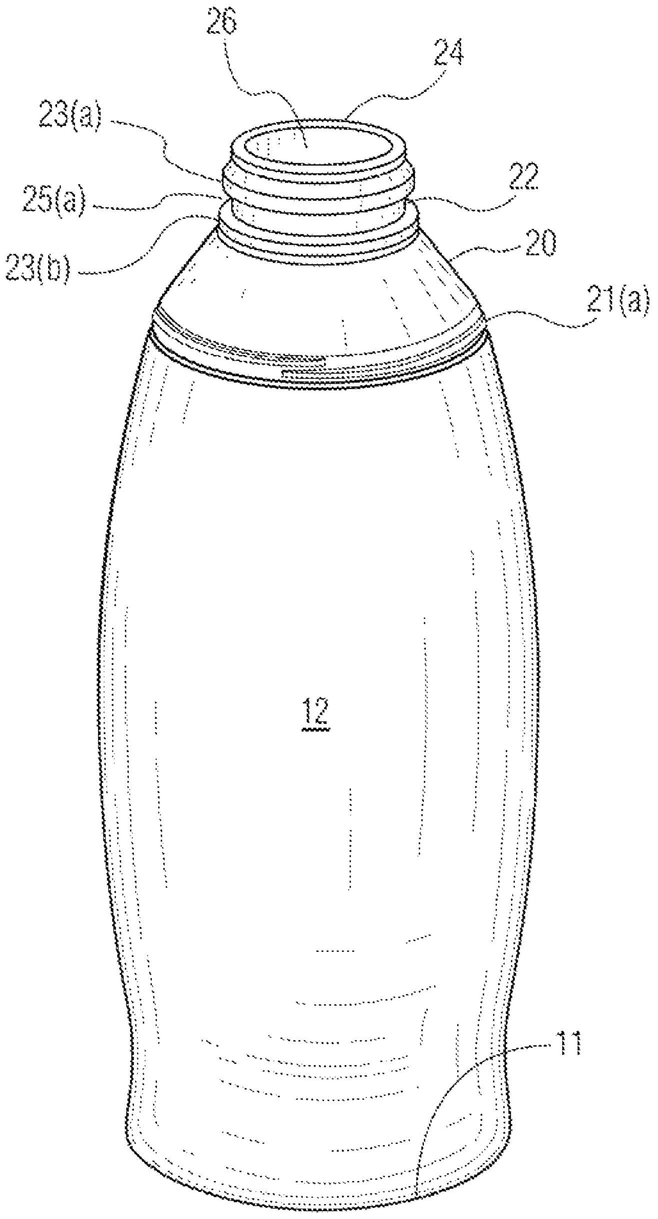
FIG. 2 is a perspective view of the body of the dispensing container of FIG. 1, according to one embodiment of the present invention.

Referring now to FIG. 2, there is shown a perspective view of the container 10 without the closure 14. The body 12 comprises a shoulder 20, a thread 21(*a*), a neck 22, a top surface 24, and a opening 26. The shoulder 20 tapers upwardly to the neck 22 which is substantially tubular in shape. The container 10 further comprises a fitment attachment flange 23(*a*) which also is the flange that may be used in the injection blow molding of the container from a preform. It is not needed for the extrusion blow molding of the container 10. The flange 23(*b*) is a support flange for a fitment 30 (seen in FIG. 3) when it is inserted into the container (seen in FIG. 7). As discussed in further detail below, the fitment 30 (see FIG. 3) will be inserted into the opening 26 and supported on the container neck top surface 24. The attachment flange 23(*a*) provides a recess 25(*a*) under the flange 23(*a*) into which projections on the fitment 30 may fit into and be held thereby securing the fitment 30 to the dispensing container 10 (see FIG. 7).

The upper portion of the container, primarily the neck portion 22, may be injection molded so that it can be held to close tolerances. The lower portion, comprising the shoulder 20, the body 12 and the base 11, may be blow molded. In such an embodiment, the threads 21(*a*) on the container shoulder 20 are blow molded. The blow molded portions do not need to be held to the same close tolerances as the injection molded portions. Likewise, the fitment 30 is injection molded so as to hold portions of the fitment 30 to close tolerances. Principally, the upper part of the fitment should be held to close tolerances to ensure a secure attachment to the neck 22.

Figure 3:
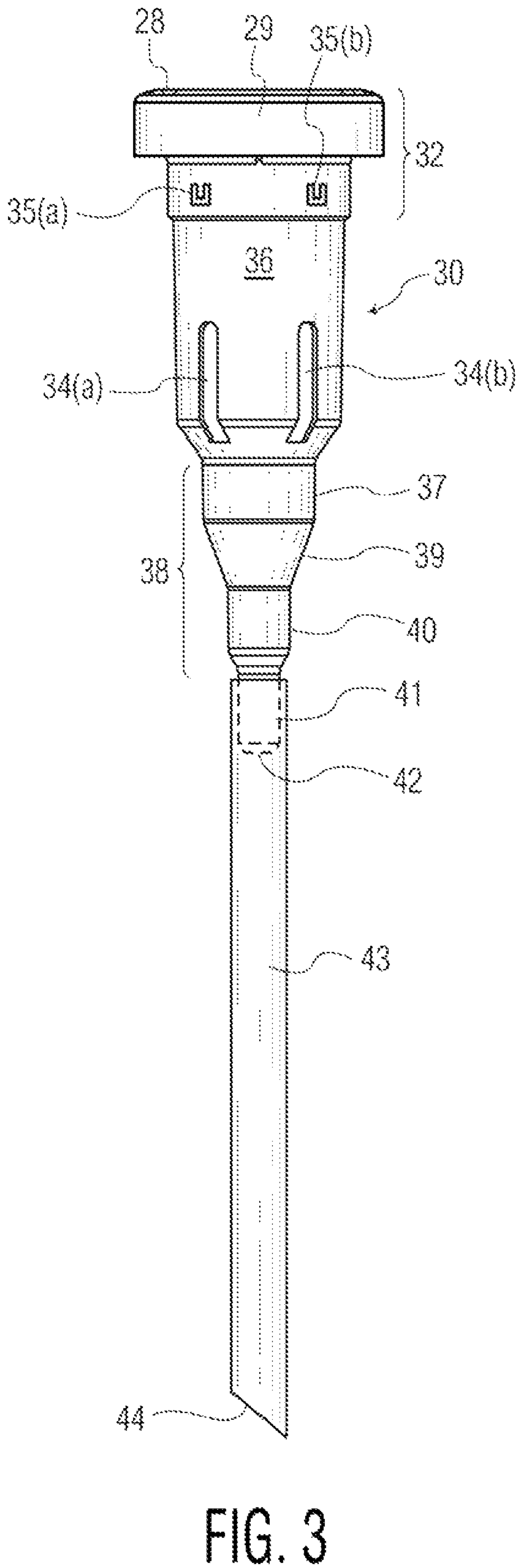
FIG. 3 is an elevation view of the fitment of the dispensing container, according to one embodiment of the present invention.
Figure 4:
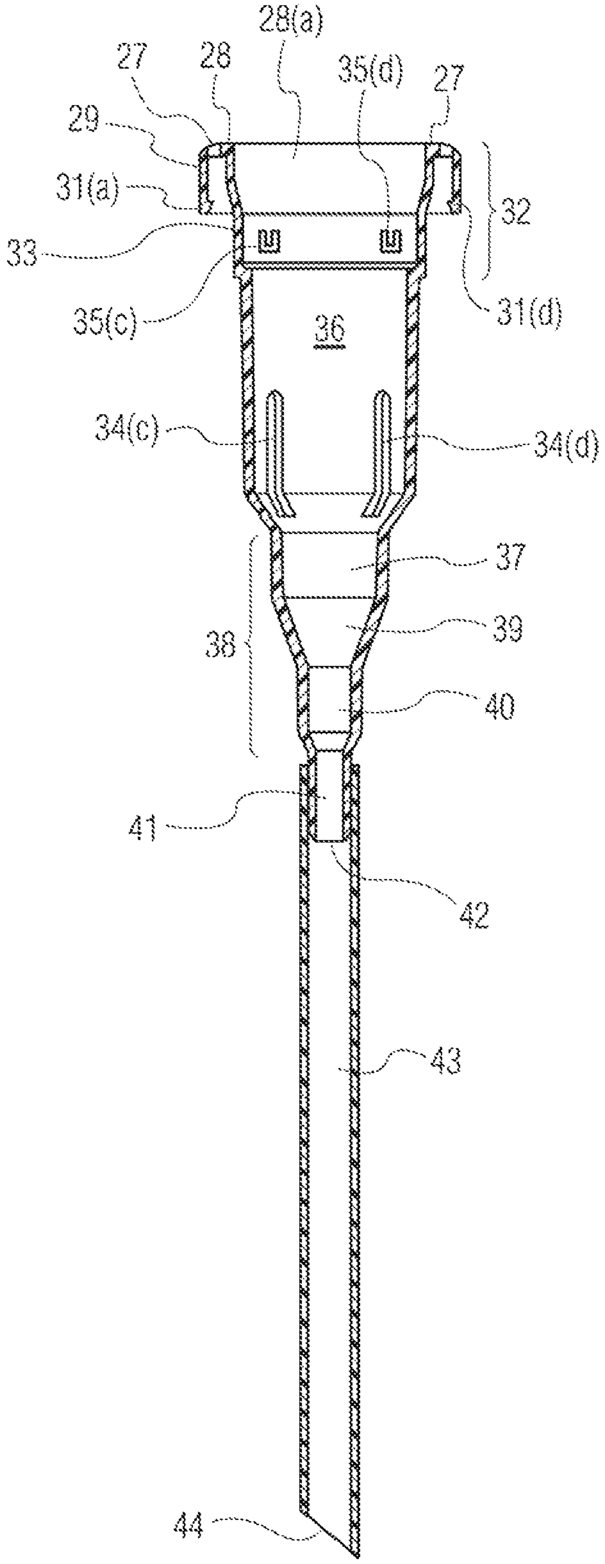
FIG. 4 is a vertical cross-section view of the fitment of FIG. 3, according to one embodiment of the present invention.
Figure 5:
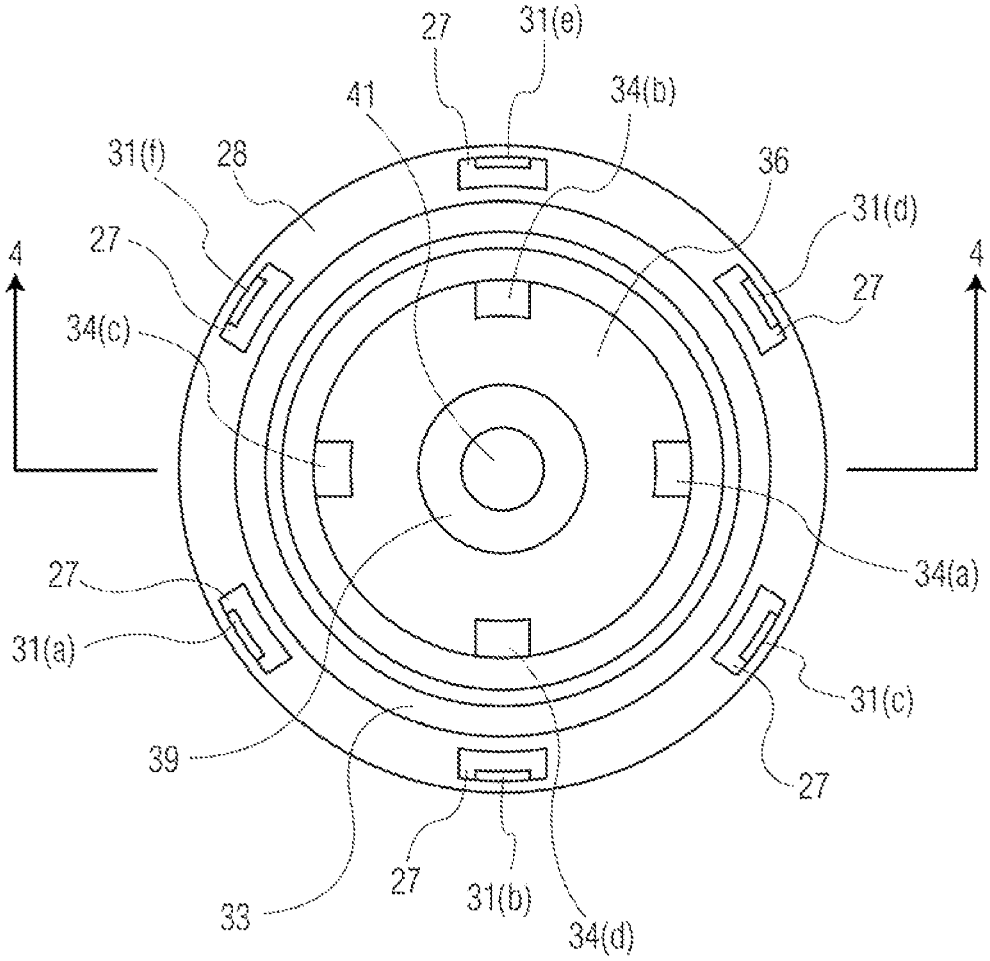
FIG. 5 is a top plan view of the fitment of FIG. 3, according to one embodiment of the present invention.

Referring now to FIGS. 3 and 4, the fitment 30 is shown in an elevation view in FIG. 3 and in cross-section in FIG. 4. The fitment 30 comprises a upper section 32, a mid-section 36 and a lower section 38. The upper section 32 comprises an opening 28(*a*) and a plurality of pressure equalization apertures 35 (*a*), 35 (*b*), 35 (*c*) and 35 (*d*) (see FIGS. 4 and 6). There is preferably at least one pressure equalization aperture, but there can be more that one or a plurality of pressure equalization apertures. The number of pressure equalization apertures and their dimensions is dependent on the volume of air to be rapidly expelled for pressure equalization. The upper section 32 is adapted for attachment to the container 10 and in this embodiment comprises a structure that attaches to the container neck 22. This structure consists of a flange 28 on the fitment top surface and a peripheral wall 29 that extends downwardly from the flange 28. The inner surface of the peripheral wall 29 has a plurality of latching projections 31(*a*), 31(*b*), 31(*c*), 31(*d*), 31(*e*) and 31(*f*) as seen in FIGS. 4 and 5. The latching projections have an upwardly and outwardly tapering shape with the upper part of the projections latching under the flange 23(*a*) in recess 25(*a*) on the neck 22. The recess 25(*a*) that receives the latching projections 31(*a*), 31(*b*), 31(*c*), 31(*d*), 31(*e*) and 31(*f*) is formed under this flange 23(*a*). There can be 2 to 6 or more of the latching projections 31(*a*), 31(*b*), 31(*c*), 31(*d*), 31(*e*) and 31(*f*). By being on the inner surface of the peripheral wall 29, the latching projections 31 cannot be seen on the assembled container 10, and cannot be released from the container 10 without essentially destroying the fitment 30. The latching projections 31(*a*), 31(*b*), 31(*c*), 31(*d*), 31(*e*) and 31(*f*) are preferably formed during the injection molding of the fitment 30.

As seen in FIGS. 3 to 5 the mid-section 36 of the fitment 30 comprises a plurality of drain apertures 34(*a*), 34(*b*), 34(*c*) and 34(*d*). There is preferably at least one drain aperture 34, but there may be more than one drain apertures. The number of drain apertures and their dimensions is dependent on the volume of liquid to be rapidly expelled from the mid-section 36 as a result of displacement from the insertion of the pump mechanism 45 into the fitment 30. The lower stepped section 38 has cylindrical structures 37 and 40, conical structure 39 and a lower section stem 41 onto which the dip tube 43 is attached. The dip tube 43 has a lower opening 44 for drawing a liquid from a container. The lower section stem 41 has an aperture 42. The fitment 30 is shown in a vertical cross-section in FIG. 4. In addition to the parts shown in FIG. 3, there is seen in FIG. 4 the pressure equalization apertures 35(*c*) and 35(*d*), the drain apertures 34(*c*) and 34(*d*), and the latching projections 31(*a*) and 31(*d*), there being six latching projections in this embodiment. The fitment 30 interior volume is of a size and shape to receive a pump mechanism 45. That is, the dimensions of the upper section 32, mid-section 36 and the lower section 38 are such that the pump mechanism 45 can be inserted into the fitment 30.

FIG. 5 is a top plan view of the fitment 30, FIG. 5 shows the latching projections 31(*a*), 31(*b*), 31(*c*), 31(*d*), 31(*e*) and 31(*f*) in more detail. These can be seen in the molding apertures 27. Also there is shown here the mid-section with mid-section drain apertures 34(*a*), 34(*b*), 34(*c*) and 34(*d*). There also is shown lower section structure 40 of lower section aperture 42.

Figure 6:
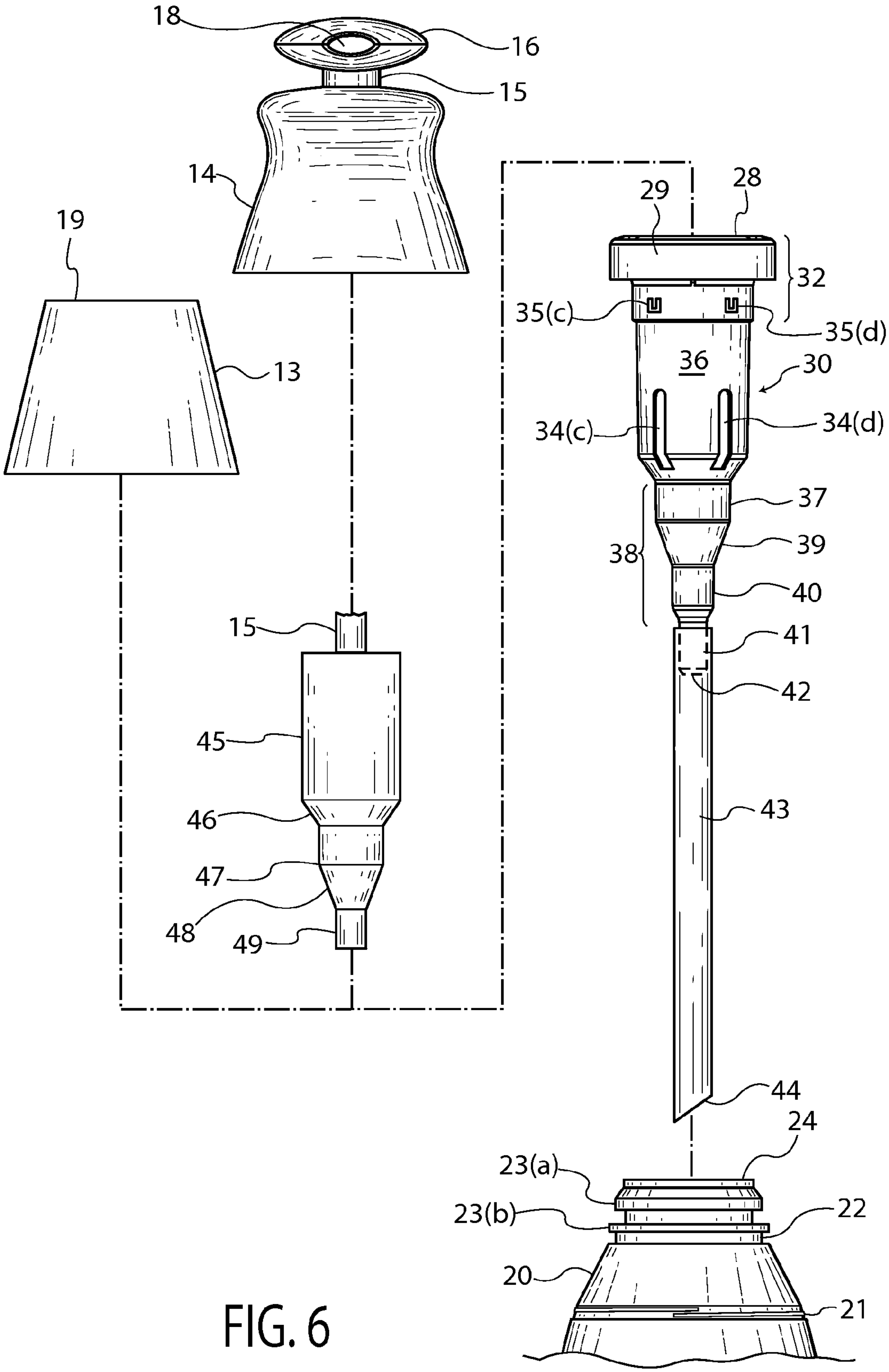
FIG. 6 is an exploded view of the dispensing container of FIG. 1 showing the upper part of the container, the fitment, the pump dispenser closure and a cap closure, according to one embodiment of the present invention.

FIG. 6 is an exploded view of the dispensing container 10 with the dispensing closure 14. Also shown is a non-dispensing closure 13 with top surface 19. The non-dispensing closure fits onto the container body 12 and is used for replacement containers 12 so that the dispensing closure 14 can be reused. The neck 22 and the shoulder 20 are the same as in FIG. 2. The fitment 30 is the same as in FIGS. 3 and 4, but with the fitment 30 shown rotated 180 degrees so that now there are seen pressure equalization apertures 35(*c*) and 35(*d*) and drain apertures 34(*c*) and 34(*d*), Pump mechanism 45 fits into fitment 30 with pump head actuator stem 15 extending from pump mechanism 45 to pump head actuator 16. The lower part of the pump mechanism 45 includes stepped sections 46, 47 and 48, which conform to, and fit into, he stepped sections 37, 39 and 40 of the lower section 38 of the fitment 30. The pump mechanism stem 49 fits into the lower section tapered section 40. The tolerances are such on the pump mechanism stem 49 and lower section stepped section 40 that a sufficient seal is formed so that liquid can be drawn up from container 10 through dip tube 43, lower section stem 41 and into pump mechanism stem 49. The liquid then traverses pump mechanism 45 and pump head actuator stem 15 to dispensing, aperture 18. The pump mechanism 45 is attached at its upper end to the dispensing closure 14. The non-dispensing closure 13 is used to close refill dispensing containers 10. The refill container is sold without the pump mechanism 45 and pump head actuator 16 which in commercial use are a single unit. When a refill unit is needed the closure 13 is removed from the refill container and the dispensing closure 14 with the attached pump mechanism 45 and the pump head actuator 16 is secured to the neck 22 and shoulder 20 to form new dispensing, container 10. Mating threads 21(*b*) on the inner surface of closure 14 engage container threads 21(*a*) on shoulder 20 of dispensing container 10. There is a seal in closure 14 to seal onto the surface of flange 28. The closure 13 has similar threads 21(*b*) on its inner surface to engage container threads 21(*a*). The closure 13 has a similar seal onto the surface of the flange 28.

FIG. 6 is an exploded view of the dispensing container 10 with the dispensing closure 14. Also shown is a non-dispensing closure 13 with top surface 19. The non-dispensing closure fits onto the container body 12 and is used for replacement containers 12 so that the dispensing closure 14 can be reused. The neck 22 and the shoulder 20 are the same as in FIG. 2. The fitment 30 is the same as in FIGS. 3 and 4, but with the fitment 30 shown rotated 180 degrees so that now there are seen pressure equalization apertures 35 (*c*) and 35(*d*) and drain apertures 34 (*c*) and 34(*d*). Pump mechanism 45 fits into fitment 30 with pump head actuator stem 15 extending from pump mechanism 45 to pump head actuator 16. The lower part of the pump mechanism 45 includes stepped sections 46, 47 and 48, which conform to, and fit into, he stepped sections 37, 39 and 40 of the lower section 38 of the fitment 30. The pump mechanism stem 49 fits into the lower section tapered section 40. The tolerances are such on the pump mechanism stem 49 and lower section stepped section 40 that a sufficient seal is formed so that liquid can be drawn up from container 10 through dip tube 43, lower section stem 41 and into pump mechanism stem 49. The liquid then traverses pump mechanism 45 and pump head actuator stem 15 to dispensing aperture 18. The pump mechanism 45 is attached at its upper end to the dispensing closure 14. The non-dispensing closure 15 is used to close refill dispensing containers 10. The refill container is sold without the pump mechanism 45 and pump head actuator 16 which in commercial use are a single unit. When a refill unit is needed the closure 13 is removed from the refill container and the dispensing closure 14 with the attached pump mechanism 45 and the pump head actuator 16 is secured to the neck 22 and shoulder 20 to form new dispensing container 10. Mating threads 21(*b*) on the inner surface of closure 14 engage container threads 21(*a*) on shoulder 20 of dispensing container 10. There is a seal in closure 14 to seal onto the surface of flange 28. The closure 13 has similar threads 21(*b*) on its inner surface to engage container threads 21(*a*). The closure 13 has a similar seal onto the surface of the flange 28.

Figure 7:
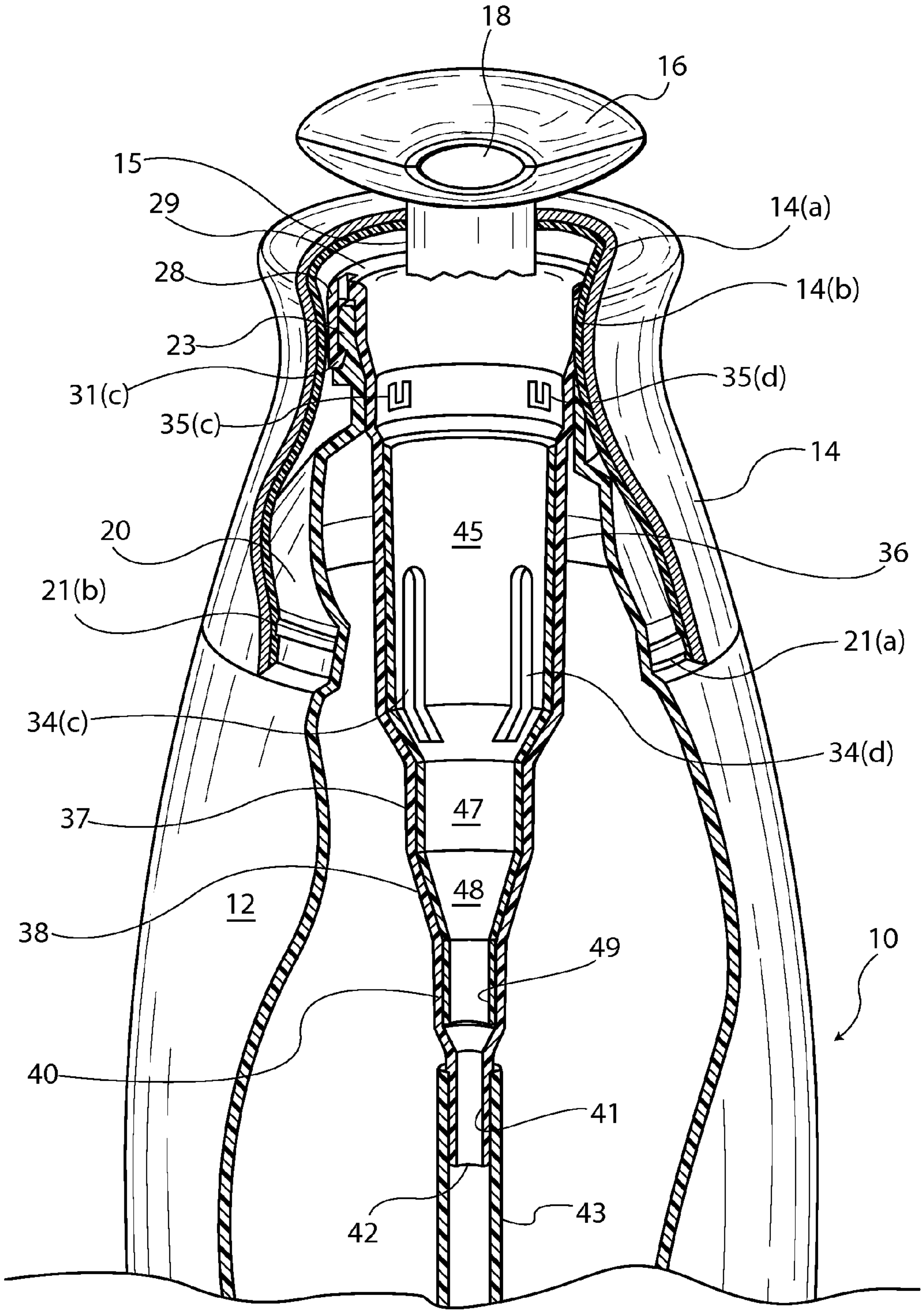
FIG. 7 is a cut-away view of the dispensing container with closure and dispensing pump of FIG. 1 and the fitment of FIG. 3, according to one embodiment of the present invention.

FIG. 7 is a cut-away view of the dispensing container 10 of FIG. 1 with the pump in the fitment. There is seen here the fitment 30 in the container 10 and the container neck 22 with the fitment 30 attachment structure. The closure 14, which in a preferred embodiment can have plastic laminate layers 14(*a*) and 14(*b*), covers the shoulder 20 of the container 12. Optionally these layers 14(*a*) and 14(*b*) can be separate layers mechanically or adhesively attached. The layer 14(*b*) will contain the threads 21(*b*). These layers can be of the same or of different materials. The closure 14 also can be of a single plastic or metallic layer structure. In the plastic single layer or laminate embodiments the closure can be injection molded. The fitment 30, as seen in FIG. 3, is an integral part of the dispensing container 10 in this view. Also shown is pump head actuator 16 with dispensing aperture 18. The fitment has the upper section 32, the mid-section 36 and the lower section 38 comprising stepped sections 37, 39 and 40. The dip tube 43 is shown extending from lower section stem 41 to into the container 10. The pump mechanism 45 is shown substantially in its entirety within the fitment 30. It is a part of dispensing closure 14. The stepped pump sections 47, 48 and 49 conform to, and fit within, the fitment stepped sections 37, 39 and 40. The pump mechanism stem 49 fits within fitment stepped section 40 and is substantially sealed within the fitment stepped section 40. As described above, the fitment 30 is attached to the container 10 in a way whereby the fitment 30 will have to be destroyed to remove it from the container 10 for the refilling of the container.

For the insertion of the pump mechanism 45 into the fitment 30 the drain apertures 34 in the fitment 30 allow for the quick flow of any product within the fitment 30 into the container 10, and pressure equalization apertures 35 in the fitment 30 allow for pressure equalization after a flow of product back into the container 10 and after a dispensing of product from the container 10. The drain apertures for the quick flow of product are in the lower part of the fitment 30 and the pressure equalization apertures are in the upper part of the fitment 30. The pressure equalization apertures remain above the liquid in the container so that air can flow there through. The drain apertures 34 and the pressure equalization apertures 35 allow for fluid flow between the fitment 30 and the container 10, therefore, the apertures 34, 35 are in communication with the interior of the dispensing container 10. These two sets of apertures 34, 35 cooperate and allow for the quick insertion of the pump mechanism 45 into the fitment 30 on the manufacturing line and for a less messy transfer of the dispensing pump assembly from an empty container to a filled container by the consumer.

This FIG. 7 also illustrates a cone on cone structure for the dispensing closure 14, for the non-dispensing refill closure 13 and the container shoulder 20. Dispensing closure 14 and the non-dispensing refill closure 13 have conical shapes conforming to that of container shoulder 20. The closure has shown has a two layer structure, an inner structural layer 14(*b*) and an outer decorative layer 14(*a*). The closures can be formed by injection molding. The cone on cone structure (cone shape of the closure and upper part of the container) provides for easier alignment of the closure 14 on the dispensing container 10 and the attachment of the closures to the container 10. This particularly is the case for applying the closures to containers on high speed filling lines. A further advantage of the cone on cone structure is to be able to place the attachment threads on a larger diameter portion of the container with the need then for fewer turns of the closures on the container to get increased closure thread and container thread contact. This will assure that neither refill closure 13 nor dispensing closure 14 will not back-off and permit the dispensing container to leak.

Figure 8:
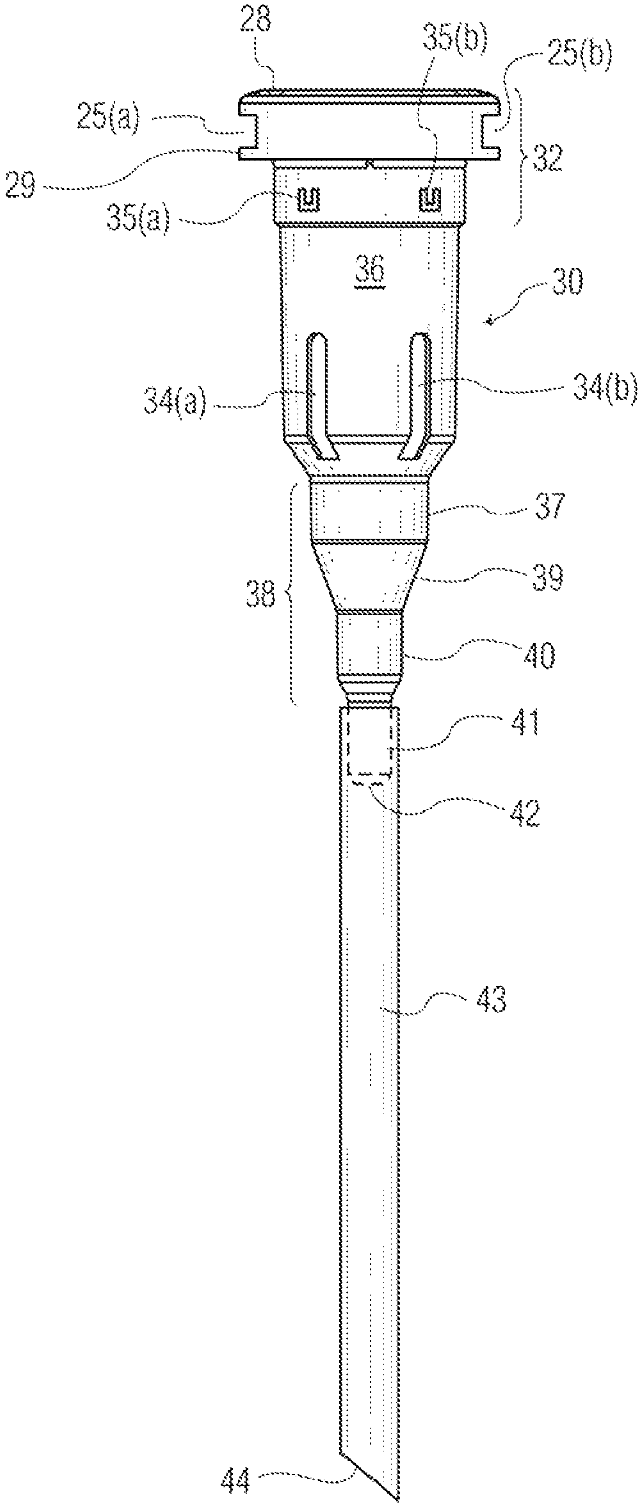
FIG. 8 is an elevation view of a fitment, according to a second embodiment of the present invention.
Figure 9:
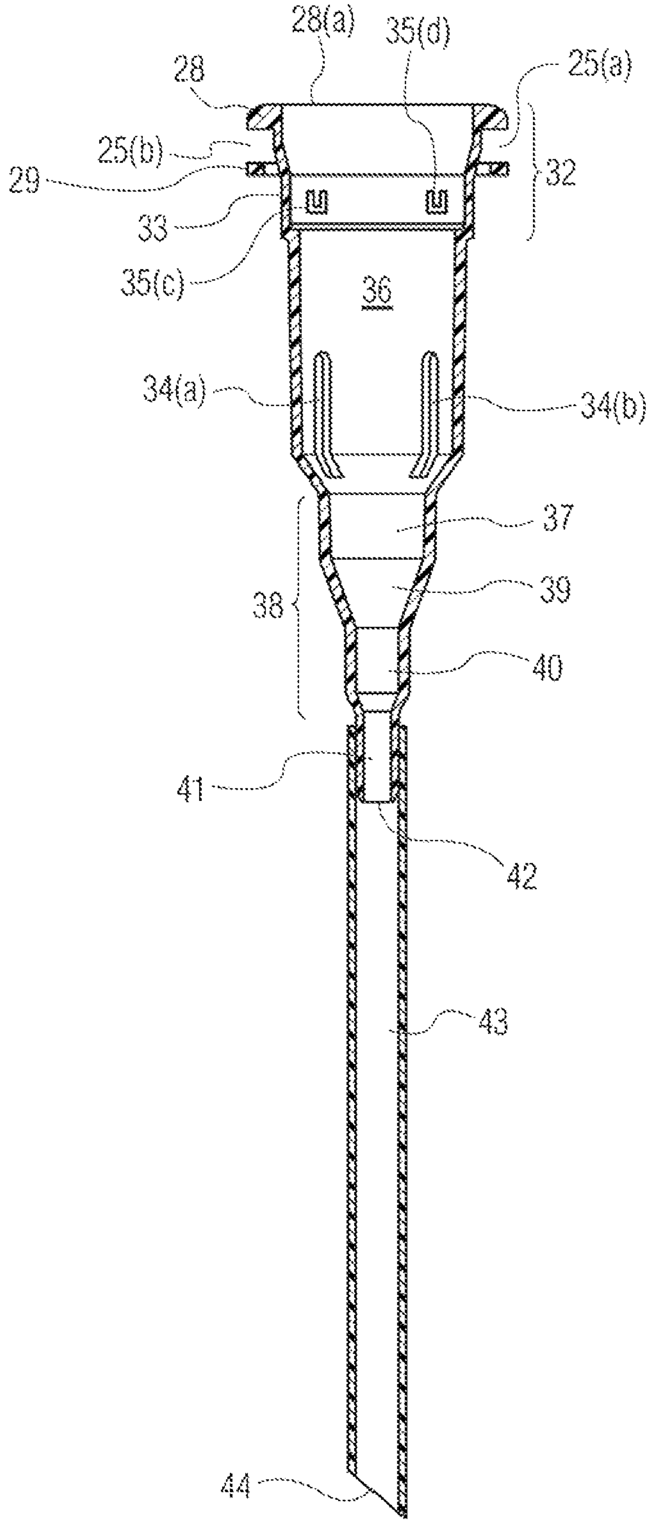
FIG. 9 is a vertical cross-section view of the fitment of FIG. 8 along line 9-9 of FIG. 10, according to one embodiment of the present invention.
Figure 10:
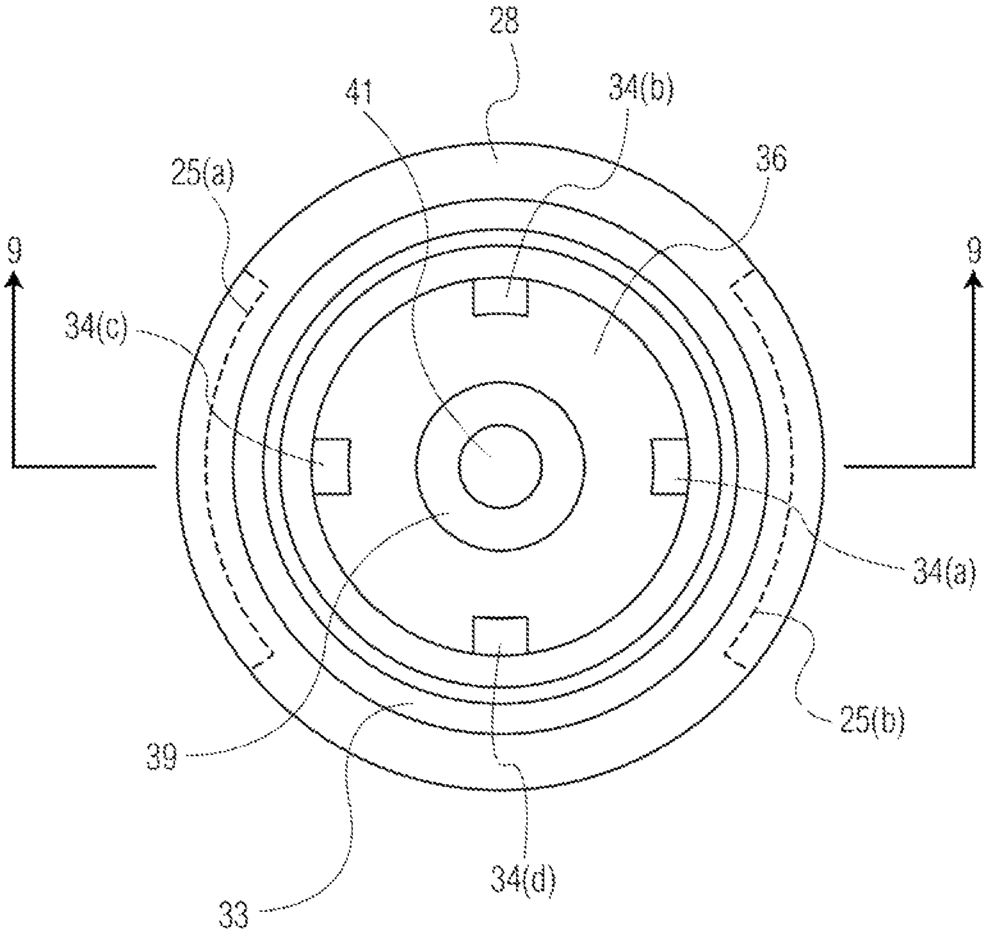
FIG. 10 is a top plan view of the fitment of FIG. 8, according to one embodiment of the present invention.
Figure 11:
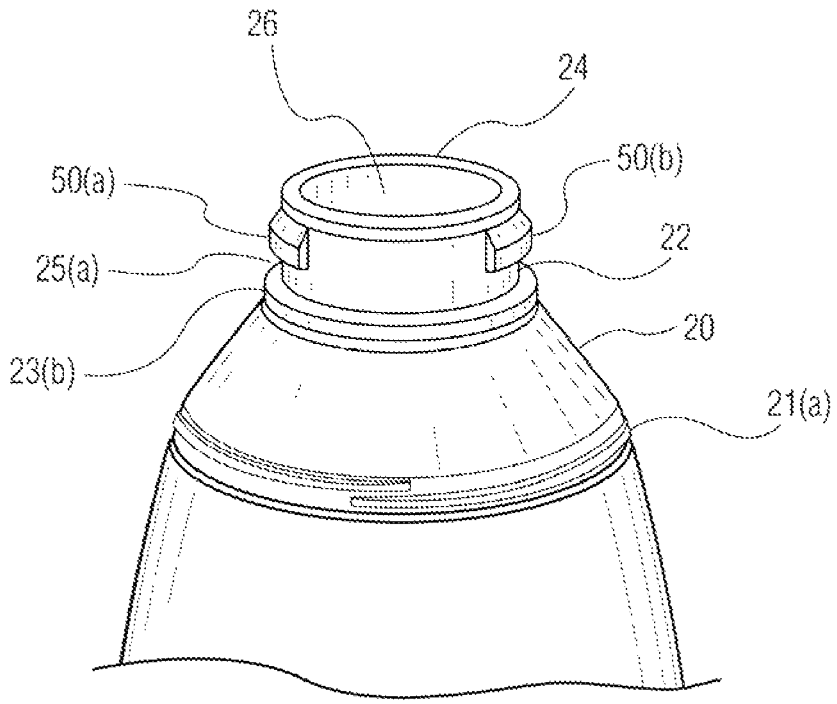
FIG. 11 is a close-up view of the upper portion of a dispensing container, according to a second embodiment of the present invention.
Figure 12:
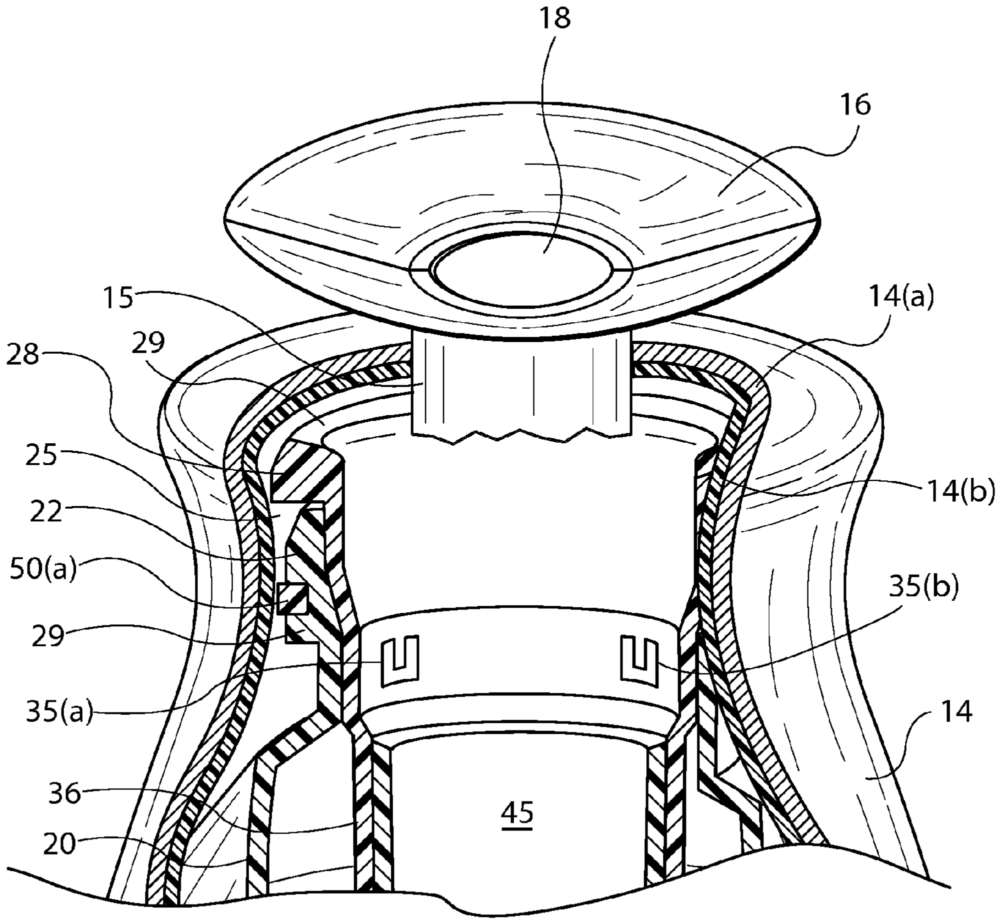
FIG. 12 is a cut-away view of the dispensing container of FIG. 11 with closure and dispensing pump of FIG. 1 and the fitment of FIG. 8, according to a second embodiment of the present invention.

FIGS. 8 to 12 show an alternate embodiment for the attachment of the fitment 30 to the dispensing container 10. In this embodiment the container will have container neck projections 50(*a*) and 50(*b*) (see FIG. 11) that extend through recess apertures 25(*a*) and 25(*b*) of the peripheral wall 29 of the upper section 32. As used in this application the term recess includes one that extends through a wall to form an aperture as well as solely into a wall. The remainder of the fitment of FIGS. 8 to 12 is essentially the same as the fitments of FIGS. 3 to 5. That is, the mid-section 36, the lower section 38 with the dip tube remain the same. FIG. 8 shows the fitment with the modified upper section 32. There is shown flange 28 and peripheral wall 29 with peripheral wall recess apertures 25(*a*) and 25(*b*). FIG. 9 is a vertical cross-section of the top plan view of the fitment in FIG. 10. The fitment opening is 28(*a*) formed within flange 28. The pressure equalization apertures 35(*c*) and 35(*d*) in fitment area 33 are seen in this view. FIG. 10 shows the drain apertures 34(*a*), 34(*b*), 34(*c*) and 34(*d*) and the peripheral wall apertures 25(*a*) and 25(*b*) (in dashed lines). FIG. 11 shows the container shoulder 20 and container neck 22. The container shoulder 20 has threads 21(*a*) and the container neck has container neck projections 50(*a*) and 50(*b*). In this FIG. 11 there is a lower flange 23(*b*) which can serve to support the fitment 30 when this fitment is inserted into the container neck 22. The container neck projections 50(*a*) and 50 (*b*) protrude through peripheral wall recess apertures 25(*a*) and 25(*b*) to thereby secure the fitment onto the container neck 22. This is an alternate technique in securing the fitment 30 to the container neck 22. The technique described in FIGS. 1 to 7 use the latching projections 31(*a*), 31(*b*), 31(*c*), 31(*d*), 31(*e*) and 31(*f*) to secure the fitment 30 to the container neck 22. There can be 2 to 6 of these latching projections. As in the prior embodiment the pressure equalization apertures and drain apertures can vary in number and dimensions.

In an alternative the fitment 30 can be bonded to the container neck 22. This can be an adhesive bonding or a heat bonding. For effective heat bonding the material of the container and the fitment should be substantially the same. This will be an absolute assurance that the fitment cannot be removed from the dispensing container and then to use the container for a counterfeit product. In such an embodiment no projections or recesses are needed on the peripheral wall or on the container neck 22 to securely attach the fitment to the dispensing container.

The container 10, closure and the fitment 30 are formed from thermoplastics. Such thermoplastics may be molded by injection molding, extrusion blow molding and injection stretch blow molding. Useful thermoplastics are the polymers and copolymers of ethylene and propylene. These include low, medium and high density polyethylenes and various grades of polypropylenes. In addition the containers can be comprised of polyesters such as polyethylene terephthalate. Further, essentially any other thermoplastic that is available can be utilized. The closures can be formed, in whole or in part, of thermoplastics. When a thermoplastic laminate or a single layer the closure can be injection molded. The same thermoplastics as discussed for the container 10 and the fitment 30 can be used for the closure 14. As noted above the closure can be solely a metal or can be a dual layer of a plastic layer and the metal layer. When a dual layer the plastic layer usually will be the inner layer and the metal the outer decorative layer.

In the high speed manufacture of the products using the present dispensing container 10, the container 10 is filled with the labeled (ounce-milliliter) content. The dispensing container 10 is sized to hold this amount giving consideration to the volume to be occupied by the fitment and the pump mechanism. After the dispensing container 10 is filled with a liquid, the fitment 30 is inserted into and locked onto the dispensing container neck 22. The pump dispensing closure 14, with the attached pump mechanism 45, then is inserted into the fitment 30. During the insertion of the fitment 30 into the container 10, liquid in the dispensing container 10 will flow up into the mid-section 36 of the fitment 30 through the drain apertures 34. Upon the subsequent insertion of the pump mechanism 45 this liquid will flow back into the dispensing container 10 through the same drain apertures 34. If these drain apertures 34 were not present, some of the liquid would flow out around the pump mechanism 45 or through the pressure equalization apertures 35 and be expelled from the container 10. This would create a mess on the manufacturing line and will result in under-filled dispensing containers. Under-filled containers violate state and local laws. In addition, when a person has finished the use of the product in a dispensing container 10 he/she will remove the closure 14 with the attached pump mechanism 45 from the dispensing container 10, remove the refill closure 13 from the refill container 10, and apply the removed dispensing closure 14 with the attached pump mechanism 45 to the refill container 10. Any liquid in the fitment of the refill container 10 will flow back into the container 10 through the drain apertures 34. It will not flow upwardly around the pump mechanism 45 and out of the refill container 10. Consequently, the drain apertures 34 function to flow liquid from the fitment 30 into the container 10 during both manufacture of the product and also when a refill container 10 is to be used. Pressure will be equalized in the container through the pressure equalization apertures 35 in the upper section 32 of the fitment.

The dispensing container has been described as one that is utilized for dispensing various products where the container portion is not to be used. This will include germicides, fungicides, medicated liquid lotions and hand soaps, and other products where the container should not be refilled. However, the pump mechanism can be used for refills of the same product. This is a cost savings since the pump mechanisms will outlast many uses for refill containers. The pump mechanism may be one that is finger or palm pump actuated or it can be a trigger actuated pump mechanism. This present concept can be applied to many types of dispensing containers and pump mechanisms.

We claim:

1. A dispensing container comprising:

a body;

a neck having an opening;

a fitment positioned in said opening and attached to said neck; and a self-contained pump dispenser comprising:

a stem having an aperture at a lower end of said pump dispenser;

a pump actuator; and a pump exit at an upper end of said pump dispenser, wherein said fitment is adapted to receive said pump dispenser and said fitment comprises:

at least one pressure equalization aperture in communication with an interior of said dispensing container;

at least one drain aperture in communication with the interior of said dispensing container; and a dip tube that that extends into said body, said dip tube adapted to surround said stem, wherein when said pump dispenser is inserted into said fitment, a liquid in said fitment can flow into the interior of said dispensing container through said at least one drain aperture.

2. The dispensing container of claim 1 wherein said fitment further comprises at least one projection and said container neck comprises at least one recess to receive said at least one projection.

3. The dispensing container of claim 1 wherein said fitment further comprises a flange that extends outwardly, said flange comprising a downwardly extending peripheral wall and at least one projection in said downwardly extending wall, said container neck comprising at least one recess, wherein said at least one recess is adapted to receive said at least one projection.

4. The dispensing container of claim 1 wherein said fitment comprises a plurality of drain apertures and a plurality of pressure equalization apertures.

5. The dispensing container of claim 1 further comprising a closure for closing the dispensing container, wherein an upper part of said body is of a conical shape, said closure having a conical shape to at least partially overlap said upper part of said body, said container body comprising threads, and said closure comprising mating threads to attach the closure to the dispensing container.

6. The dispensing container of claim 1 wherein each of said neck and said fitment are injection molded and said body is blow molded.

7. The dispensing container of claim 1, wherein said at least one pressure equalization aperture is in an upper section of said fitment.

8. The dispensing container of claim 7, wherein said at least one pressure equalization aperture is above a liquid in the body.

9. A dispensing container comprising:
a body;
a neck having an opening;
at least one of a recess or a projection on an exterior surface of said neck;
a fitment positioned in said opening, the fitment comprising:
an upper section, a flange that extends outwardly from said upper section, said flange comprising a downwardly extending peripheral wall having at least one of a projection or an aperture to mate with said at least one of a recess or a projection on said neck; and
a self-contained pump mechanism in said fitment comprising: a stem having an aperture at a lower end: a pump actuator; and a pump exit at an upper end,
wherein said fitment further comprises:
at least one pressure equalization aperture in communication with an interior of said dispensing container;
a dip tube that extends into said body and of a cross-section to accept said stem; and
at least one drain aperture in communication with said interior of said dispensing container, wherein when the pump mechanism is inserted into said fitment, a liquid in the fitment can flow into the body through the at least one drain aperture and pressure in the body from the liquid flow from the fitment into the body is equalized through the at least one pressure equalization aperture.

10. The dispensing container of claim 9 wherein said fitment comprises a plurality of drain apertures in a mid-section of said fitment; and a plurality of pressure equalization apertures in an upper section of said fitment.

11. The dispensing container of claim 9 further comprising:
a closure for closing the container, an upper part of said body having a conical shape, the closure having a conical shape to at least partially overlap the upper part of the body;
threads on the upper part of the body; and
mating threads on the closure.

12. The dispensing container of claim 9 wherein said neck and said fitment are each injection molded and said body is blow molded.

* * * * *